US006383456B1

(12) United States Patent
Hartel et al.

(10) Patent No.: US 6,383,456 B1
(45) Date of Patent: May 7, 2002

(54) CONTINUOUS CRYSTALLIZATION SYSTEM WITH CONTROLLED NUCLEATION FOR MILK FAT FRACTIONATION

(75) Inventors: Richard W. Hartel; Liang Baomin; Shi Yuping, all of Madison, WI (US)

(73) Assignee: Wiconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/620,284

(22) Filed: Jul. 20, 2000

Related U.S. Application Data

(62) Division of application No. 09/074,351, filed on May 7, 1998, now Pat. No. 6,140,520.
(60) Provisional application No. 60/046,166, filed on May 12, 1997.

(51) Int. Cl.[7] ............................................... C30B 29/54
(52) U.S. Cl. ..................... 422/245.1; 126/60; 554/175; 554/211; 426/417
(58) Field of Search ................... 422/243.1; 127/60; 534/211, 175; 426/417

(56) References Cited

U.S. PATENT DOCUMENTS

| | | | |
|---|---|---|---|
| 4,004,886 A | * 1/1977 | Thijssen et al. | ......... 422/245.1 |
| 4,005,228 A | 1/1977 | Norris | ......................... 426/586 |
| 4,161,484 A | 7/1979 | Van Den Berg | |
| 4,235,796 A | 11/1980 | Paulicka | |
| 4,260,584 A | * 4/1981 | Ore et al. | .................... 422/189 |
| 4,588,604 A | 5/1986 | Baker et al. | ................ 426/601 |
| 4,816,079 A | * 3/1989 | Ahrens et al. | ................ 127/60 |
| 4,839,190 A | 6/1989 | Bumbalough | ............... 426/603 |
| 5,069,915 A | 12/1991 | Devitt et al. | .................. 426/93 |
| 5,230,769 A | * 7/1993 | Jancic et al. | ............. 422/245.1 |
| 5,338,518 A | 8/1994 | Jancic et al. | |
| 5,395,531 A | 3/1995 | Degen et al. | ................ 210/636 |
| 5,401,867 A | 3/1995 | Sitzmann | |
| 5,523,064 A | * 6/1996 | Schranz | ................... 422/245.1 |
| 5,980,640 A | * 11/1999 | Nurmi et al. | .................. 127/60 |

OTHER PUBLICATIONS

Lohman, M. H. and R. W. Hartel, "Effect of Milk Fat Fractions on Fat Bloom in Dark Chocolate", *JAOCS* 71 (3): 267–277 (Mar., 1994).

Deffense, E., "Milk Fat Fractionation Today: A Review", *JAOCS* 70 (12): 1193–1201 (Dec. 1993).

Bystrom, C. E. and R. W. Hartel, "Evaluation of Milk Fat Fractionation and Modification Techniques for Creating Cocoa Butter Replacers", *Lebensm.–Wiss.u.–Technol.* 27:142–150 (1994)—published sufficiently before filing date such that the month is not an issue.

Grall, D.S. and R. W. Hartel, "Kinetics of Butterfat Crystallization", *JAOCS* 69 (8): 741–747 (Aug. 1992).

Arul, J., A. Boudreau, J. Makhlouf, R. Tardif, and M. R. Sahasrabudhe, "Fractionation of Anhydrous Milk Fat by Superficial Carbon Dioxide", *Journal of Food Science* 52 (5): 1231–1236 (1987)—published sufficiently before filing date such that the month is not an issue.

(List continued on next page.)

*Primary Examiner*—Robert Kunemund
(74) *Attorney, Agent, or Firm*—Michael Best & Friedrich LLP; Teresa J. Welch; Jeffrey D. Peterson

(57) ABSTRACT

An apparatus and method of fractionating mixed triglycerides, more particularly anhydrous milk fat, are disclosed. The apparatus and method provide for the separation of the steps of nucleation and crystal growth. Precise control of energy input for nucleation and crystal growth in a static environment at higher temperatures than the nucleation temperature result in the production of a solid fraction characterized by higher yields and a uniform MMT.

19 Claims, 15 Drawing Sheets

Suggested Procedures of Nucleus Formation and Crystal Growth

OTHER PUBLICATIONS

Bhaskar, A. R., S. S. H. Rizvi, and J. W. Sherbon, "Anhydrous Milk Fat Fractionation with Continuous Countercurrent Supercritical Carbon Dioxide", *Journal of Food Science* 58 (4): 748–752 (1993)—published sufficiently before filing date such that the month is not an issue.

Rizvi, S. S. H. and A. R. Bhaskar, "Supercritical Fluid Processing of Milk Fat: Fractionation, Scale–Up, and Economics", *Food Technology*: 90–97 (Feb. 1995).

Boudreau, A. and J. Arul, "Cholesterol Reduction and Fat Fractionation Technologies for Milk Fat: An Overview", *J. Dairy Sci.* 76 (6): 1772–1781 (1993)—published sufficiently before filing date such that the month is not an issue.

Arul, J., A. Boudreau, J. Makhlouf, R. Tardif, and B. Grenier, "Distribution of Cholesterol in Milk Fat Fractions", *Journal of Dairy Research* 55: 361–371 (1988)—published sufficiently before filing date such that the month is not an issue.

Shi, Y., B. Liang, A Boudreau, and J. Arul, "Effect of Process Variables on Crystallization of Milk Fat from the Melt", presented at Annual Meeting of AOCS (Canadian Section), Winnipeg, Oct. 22–24, 1991.

Black, R. G., "Pilot–Scale Studies of Milk Fat Fractionation", *Australian J. Dairy Technol.* 28 (3): 116–119 (1973)—published sufficiently before filing date such that the month is not an issue.

Black, R. G., "Partial Crystallization of Milkfat and Separation of Fractions by Vacuum Filtration", *Australian J. Dairy Technol.*: 153–157 (Dec., 1975).

J. M. DeMan, "Physical Properties of Milk Fat", *J. Dairy Res.* 28 (2): 117–123 (1961)—published sufficiently before filing date such that the month is not an issue.

Deffense, E., "Multi–Step Butteroil Fractionation and Spreadable Butter", *Fat Sci. Techn.* 13 (1987)—published sufficiently before filing date such that the month is not an issue.

deMan, J. M. and M. Finoro, "Characteristrics of Milk Fat Fractionated by Crystallization from the Melt", *Can. Inst. Food Sci. Technol. J.* 13 (4): 167–173 (Oct., 1980).

Fjaervoll, A., "Anhydrous Milk Fat Fractionation Offers New Applications for Milk Fat", *Dairy Industries:* 502–505 (Aug., 1970).

Gresti, J., M. Bugaut, C. Maniongui, and J. Bezard, "Composition of Molecular Species of Triacylglycerols in Bovine Milk Fat", *J. Dairy Sci.* 76 (7): 1850–1869 (1993)—published sufficiently before filing date such that the month is not an issue.

Kaylegian, K. E., R.W. Hartel, and R. C. Lindsay, "Applications of Modified Milk Fat in Food Products", *J. Dairy Sci.* 76 (6): 1782–1796 (1993)—published sufficiently before filing date such that the month is not an issue.

Metin, S. and R. W. Hartel, "Crystallization Behavior of Blends of Cocoa Butter and Milk Fat or Milk Fat Fractions", *J. Thermal Anal.* 47: 1527–1544 (1996)—published sufficiently before filing date such that the month is not an issue.

Norris, R., I. K. Gray, A. K. R. McDowell, and R. M. Dolby, "The Chemical Composition and Physical Properties of Fractions of Milk Fat Obtained by a Commercial Fractionation Process", *J. Dairy Res.* 38: 179–191 (1971)—published sufficiently before filing date such that the month is not an issue.

Timms, R. E., "The Phase Behaviour and Polymorphism of Milk Fat, Milk Fat Fractions and Fully Hardened Milk Fat", *Australian J. Dairy Technol.* 35 (2): 47–53 (Jun., 1980).

Tirtiaux, A., "Dry Multiple Fractionation: A Low Cost Modification Process", Paper Presented at "Oils and Fats in the Nineties", Denmark—Mar. 23–26, 1992—IFSC, 1–17.

Schaap, J. E. and G. A. M. Rutten, "Effect of Technological Factors on the Crystallization of Bulk Milk Fat", *Neth. Milk Dairy J.* 30: 197–207 (1976)—published sufficiently before filing date such that the month is not an issue.

\* cited by examiner

CONTINUOUS CRYSTALLIZATION SYSTEM WITH CONTROLLED NUCLEATION FOR MILK FAT FRACTIONATION

This application is a divisional of patent application Ser. No. 09/074,35 now U.S. Pat. No. 6,140,520 filed May 7, 1998 in the United States Patent and Trademark Office, which claims priority under 35 U.S.C. § 119, to provisional patent application no. 60/046,166 filed May 12, 1997.

FIELD OF THE INVENTION

The present invention relates to the fractionation of mixed populations of triglycerides, more particularly triglycerides contained in anhydrous milk fat.

BACKGROUND

Mixtures of mixed triglycerides, and more particularly anhydrous milk fat (AMF), have proven utility as a food component when separated into fractions containing different populations of triglycerides. However, difficulty in processing milk fat and fractionating the triglycerides in commercial scale has restricted its use in the food industry in the United States. In Europe, where fat fractionation is carried out in a batch process, the practice is more common.

The properties of milk fat vary greatly depending upon the season, the region, the breed of dairy cow and even the animal feed. Since AMF is composed of an exceedingly large variety of fat molecules in the form of triglycerides, the properties of AMF are a normalized average of the characteristics of its individual components. A homogenous fraction of any one or a group of related triglycerides has different physical properties (e.g. different melting points, blending properties with baking or confectionery ingredients, and textural characteristics). The characteristics of milk fat and associated physical properties such as melting point have been studied, but cannot be precisely determined from one batch to the next. In general, ordinary AMF has a wide melting range which makes it unsuitable for many food applications.

Fractionation of milk fat is a process of separating the triglyceride components of milk fat on the basis of their melting points. As a result of the varying characteristics of the milk fat, the fractionation of milk fat is as much art as it is science because the many variables are difficult to control in conventional batch procedures.

Fractionation is accomplished by the selective crystallization of the triglyceride components of a mass of melted AMF. The energy for crystallization is equal to the difference between the melting point of the triglycerides and the actual solution temperature. Crystallization from the melt is characterized by the formation of a lattice structure as the triglycerides molecules undergo a phase transition from liquid to solid. Crystallization occurs in two stages. The first is nucleation where embryonic crystals referred to as nuclei are formed. The second stage is crystal growth which involves diffusion of the triglycerides into the growing crystal lattice structure.

Interestingly, it is found that the actual distribution of fatty acids contained in the various fractions obtained at high, medium, or low temperatures from a melt does not differ as much as might be expected. This appears to be explained by the degree of saturation and chain length of the fatty acids on the intact triglyceride. Fractions having a high temperature (40–50° C.) melting profile generally have a total carbon chain length for the three glycerols (acyl carbon number) of C44 to C54, and those having a low temperature (<20° C.) melting profile generally have a total carbon (C) chain length from C26 to C42. The relation of the triglyceride composition of different fractions to the crystalline forms and polymorphisms and to various product applications is reviewed in E. Deffense, JAOCS, 70: 1193 (1993) which is hereby incorporated by reference.

Currently, most milk fat fractionation is performed using the Tirtiaux dry fractionation process. This process essentially involves crystallization by cooling of a commercial batch of milk fat. Depending on capacity of the equipment from 10 to 100 tons/day of AMF may be processed. The crystallization is performed by heating the AMF to create a stabilized melt and then cooling and agitating the melt and collecting a solid fraction crystallizing at a relatively high temperature. The process is repeated to collect fractions crystallizing at successively lower temperatures.

In the prior art, it is believed that the agitation of milk fat during cooling improves the crystallization, thereby improving the fractionation. The batch of milk fat is slowly cooled and gently agitated in a slow, controlled process, taking up to 24 hours for a single batch. Nucleation and crystallization both occur in an agitated environment.

In the Tirtiaux method, the hard fractions obtained are collected over a range of upper temperatures to form hard stearin, and a liquid portion known as olein. In a repeat of the crystallization step on the olein fraction, a second soft stearin and olein fraction are obtained. This olein can then be further cooled to lower temperatures to create fractions with intermediate (20–30° C.) and low (<15° C.) melting points. These fractions can be used in various compositions to yield milk fat/oil homogenates with improved properties in confectioneries and shortenings.

SUMMARY OF THE INVENTION

The present invention overcomes the limitations of the prior art by more precisely controlling the triglyceride fractionation process. Additionally, the present invention makes triglyceride fractionation more commercially usable because the process may operate alternatively in continuous flow mode or batch mode, in contrast to prior art processes which are limited to batch mode only. As a result, a significantly shorter residence time is required (e.g. 4 or 5 hours in the present invention instead of up to 24 hours in the Tirtiaux process). Also, some of the equipment components may be made smaller and less costly. Further, and perhaps most importantly, the triglyceride fractions may be more precisely controlled to achieve different and reproducible properties in the final product.

The present invention separately and precisely controls induced nucleation (which is a nuclei generation procedure by imposing an additional energy to the metastable melt) and crystal growth of the triglycerides. By separately controlling triglyceride nucleation and crystal growth, it becomes possible to utilize separate specialized components, and configure them in series. The present invention thus provides a continuous process for triglyceride fractionation.

The present invention may also be used in conjunction with a seeding process, which is another means of induced nucleation. In the seeding process, a particulate is added to the melt to provide a site for crystal formation. Such seeding may result in increased output and efficiency of the process, and decreased energy input. Proper use of seeding is made possible by the precise control of the separate aspects of the crystal formation and growth processes.

It may be more efficient to fractionate the triglyceride mass in separate iterations of the process. In this multistage process, individual passes through the apparatus may be tailored to fractionating out more specific portions of the triglyceride mass to obtain different solid and liquid fractions, and higher processing rates may be obtained. In a preferred embodiment, 2 or 3 iterations of the process may be used, each producing a solid fraction with a desired MMT (successively lower with each iteration) and a liquid fraction.

In accordance with the present process, a mass of mixed triglycerides is heated to form a stabilized homogenous melt at about 65–75 degrees C. The melt is pumped through a conventional heat exchanger of high capacity (capable of reducing the temperature from about 70 degrees Centigrade to nucleation temperature in tens of seconds) so as to supercool the mass of triglycerides below its melting point. For a continuous process, the melt is preferably cooled at about 20° C. per minute. In a batch process, the melt is preferably cooled at a rate of about 1.0° C. per minute. The supercooled melt is nucleated as a separate, isolated step in a relatively small volume under turbulent conditions while agitating sufficiently to form prenucleation clusters (regions throughout the melt of increased density/viscosity), followed by nuclei formation under appropriate shear conditions which attain or exceed the delta G (Gibbs free energy) threshold for critical size, the minimum size that crystalline particles can survive in the solution and not be dissolved. The nucleated mass of triglycerides is then transferred to a larger crystallizer where temperature is controlled (usually at temperatures slightly elevated above the nucleation temperature), and the crystallization process continues at a fast rate in a static environment and the crystals experience a structure transformation to produce higher quality crystals than are attained during further agitation and cooling. Alternatively, the above method may be practiced in a batch mode with the proper equipment.

The slow sedimentation step allows a more uniform crystallization to form a fraction of more uniform and predictable content, as indicated by correlation of the triglyceride profiles of the starting material with the composition of the final product obtained after collection of the crystalline sediment. A significant advantage of the present process is that the nucleation step, which in large batch is difficult to control because of the generation of highly variable shear forces throughout the batch, is now isolated in a small volume where the forces are more uniform throughout the solution.

In the apparatus of the invention, the functions of melting, supercooling, nucleation, and crystal growth are preferably carried out in separate vessels, in order to gain the requisite control over individual steps. In this way an appropriate level of control can be exerted over each particular step as to the individual requirement. Thus, the melt step utilizes a large batch tank that is steam jacketed, and equipped with an agitator. This configuration can keep all the milk fat components in a homogeneous mix at a constant temperature.

The apparatus also includes a heat exchanger of conventional construction, having a capacity to rapidly cool the melt to supercooled temperatures in about tens of seconds from about 70 degrees Centigrade to about nucleation temperature. The exchanger is sized to achieve reduction in temperature of a volume of melt equal to one batch of processing in a nucleator chamber. The nucleator chamber is designed according to a shape and volume, so that with suitable stirring means disposed therein, relatively uniform shear forces are distributed within the volume of melt contained in the chamber. The shape, volume, and shape and position of baffles and stirring means are determined in accordance with conventional engineering principles of fluid dynamics taking into account the viscosity and other flow parameters of the melt, and the velocities of flow needed to attain the range of Reynolds number of agitation calculated for melts of varying triglyceride content.

In another embodiment of the apparatus, the functions of melting, supercooling, nucleation and crystal growth are carried out in the same vessel, herein referred to as a combination melting/nucleating/crystallizing unit or simply combination unit. The combination unit includes a vessel with a steam jacket for melting, a heat exchanging means for cooling the melt and an energy input means for nucleation and agitating the melt. The heat exchanging means is preferably capable of decreasing the temperature of the melt at a rate of about 1.0 degree Centigrade per minute. Most preferably, the heat exchanging member is capable of decreasing the temperature of the mass of mixed triglycerides from about 70 degrees Centigrade to the nucleation temperature as rapidly as possible or in about 20 minutes. The energy input means is capable of providing the delta G (Gibbs free energy) threshold for critical size for nucleation. The shape and position of the energy input means with respect to the baffles created by the heat exchange means are determined in accordance with conventional engineering principles of fluid dynamics taking into account the viscosity and other flow parameters of the melt, and the velocities of flow needed to attain the range of Reynolds number of agitation calculated for melts of varying triglyceride content.

DESCRIPTION OF THE PREFERRED EMBODIMENT

Figure 1:
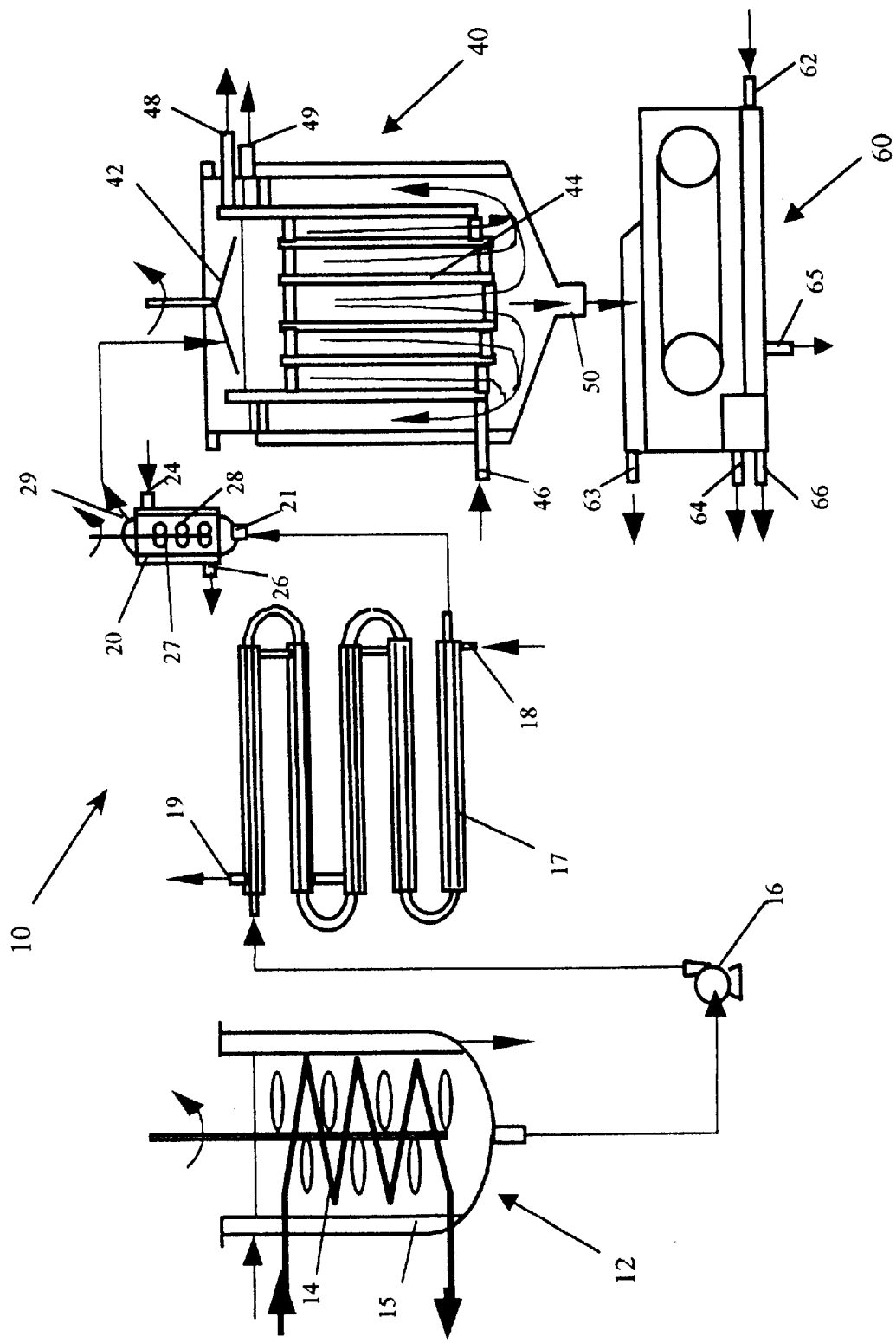
FIG. 1 is a schematic illustration of a fat fractionating apparatus embodying the invention with a separate melting tank, heat exchanger, nucleator and crystallizer.

In the process of the present invention, it is important to isolate the various steps to achieve optimal control over the parameters critically significant in the particular step. The inventive method derives from a realization that the batch mode of prior art processes can never be adjusted to create optimum conditions for all steps. Conventional batch processes cannot achieve rapid cooling of a large volume. As a result, nucleation, crystallization, and redistribution of crystal forms by shear are overlapping processes, leading to nonuniform and generally irreproducible final products (i.e. mixed crystals with less defined and less predictable properties). In the present invention, the steps of nucleation and crystal growth are separated, as opposed to current methods where nucleation and crystal are concurrent. This separation of nucleation and crystal growth is achieved by incorporating a transient nucleation step where energy is provided to a supercooled, supersaturated solution to induce nucleation, followed by crystal growth in a static environment. The result is the reproducible production of solid fraction with well defined characteristics such as melting point. The method and apparatus of the present invention may be used to fractionate any mass of mixed triglycerides, e.g. tallow, lard, bacon fat,. palm oil or AMF.

The inventive method of the present invention may be practiced by a batch process or continuous process. Applicants refer to the present process as a continuous process, in that there is a flow through the components of the apparatus in continuous fashion. The process may also be viewed as "discontinuous" in the sense that the principle process steps are isolated under control of the parameters important for the individual step. The distinction is not significant if it is kept in mind that there is a continuous process flow through a series of isolated, disconnected steps. An alternative batch process contemplates the use of combination unit designed with the proper heat exchanging capacity for rapid cooling and the proper geometric configuration to allow for uniform energy input during nucleation.

Before fractionation begins, the optimal operating parameters for nucleation and crystal growth must be determined. The goal of fractionation is to produce solid and liquid fractions having a desired and uniform maximum melting temperature (MMT) with the highest yield from a particular source of mixed triglycerides. Example 6 demonstrates the determination of appropriate values for energy input, nucleation temperature and crystal growth temperature. Details of the techniques utilized to monitor process parameters are set forth in the articles E. Deffense, *JAOCS*, 70:1193 (1993), and D. S. Grall and R. W. Hartel, *JAOCS*, 69:741 (1992) which are incorporated herein by reference.

After the operating parameters have been determined, the first step in fractionation of triglycerides, including AMF, is melting the mass of mixed triglycerides. In the melt step, it is desirable to produce a melt in the largest possible volume which can be maintained stably during a reasonable processing period. The only requirements in the melt step are precise temperature maintenance and sufficient agitation to provide homogeneity of composition throughout the batch. Generally, heating the mass of mixed triglycerides to a temperature of about 65 to 75 degrees Centigrade for about 10 minutes and stabilizing it for about 30 minutes are sufficient.

In practice, mixed triglycerides are melted in a melting tank equipped with an agitator, a heating coil and a heating jacket. Steam, hot water, or a combination of the two are suitable heating media. The triglycerides are heated for 10 minutes to completely melt the triglycerides. The molten triglycerides (the "melt") are then gently agitated and maintained in the temperature range of about 60 to 70 degrees Centigrade for 30 minutes for stabilization. For continuous operation, two melting tanks are needed to supply molten, stabilized triglycerides.

The molten triglycerides are then transported via a pump to a heat exchanging means in a continuous process. The heat exchanging means may be a double tube annular, plate type, or shell and tube type heat exchanging unit, all known in the art. In the preferred method, the melt flows through a double tube annular heat exchanger in a countercurrent fashion with the mixed triglycerides in the inside of the tube and coolant in the annulus. The inside of the heat exchanger unit and fittings should be as smooth as possible to prevent premature nucleation. In a batch type apparatus, the heat exchanging means is mounted in the combination unit. Coolant is circulated through the heat exchanging means, preferably an annular type heat exchanger, to cool the melt at the required rate.

The present cooling step requires a high surface area to volume interaction between the cooling elements and the melt. Any number of conventional heat exchanging means are available, as described above. It is desirable that these systems as applied to the present process have the capacity to reduce the temperature of the melt volume at a rate of greater than 20 degrees Centigrade per minute, most preferably from about 70 degrees Centigrade to the nucleation temperature in tens of seconds, even though these requirements may not be needed for particular batches in the case of a particular desired end product.

With respect to the nucleation step, it is desirable that nucleation not overlap crystal growth. The appropriate nucleation temperature is determined as in Example 4. Shear forces uniformly distributed through the supercooled melt provide the necessary delta G in free energy to the system for nucleation to occur. It is important that the surface area of the shear inducing means be sufficiently favorable to the melt volume that such uniformity is achieved.

In the continuous process, the cooled AMF melt is immediately transported into a specially designed, structurally separate nucleator chamber which includes an energy input means, a cooling jacket, and a smooth inside surface. Preferably, the energy input means is an agitator comprised of a plurality of impellers. The agitator rotates inside the nucleator. Preferably the rotation of the agitator inputs sufficient energy into or agitates the solution to produce turbulence providing the delta G (Gibbs free energy) threshold for critical size for nuclei formation. Preferably, coolant is pumped through the nucleator to keep the nucleator at the required nucleation temperature. Agitation of the cooled melt to induce nucleation is transient. Normally about 30 to 60 seconds is sufficient to provide the appropriate free energy for nucleation.

In the batch type process, the energy input means is mounted in the combination unit. The energy input means preferably comprises a plurality of impellers, paddles or baffles, or a combination thereof, sufficient to provide the delta G (Gibbs free energy) threshold for critical size for nuclei formation. The energy input means is operated transiently, for about 30 to 60 seconds, to induce nucleation in the cooled melt.

Finally, in the crystal growth phase of the process the temperature is shifted quickly to an optimum level for the composition of final product desired. The appropriate crystal growth temperature may be determined as in Example 4, and in contrast to conventional fractionation, crystal growth may be carried out at slightly elevated temperatures to those utilized for nucleation. In any event, in the present process, changing the temperature will not affect nucleation of the next batch, as the steps are not overlapping.

In the continuous process, the AMF flows immediately into a specially designed crystallizer which consists of a distributor, a heat exchanging means, preferably a set of annular cooling units with distances of about 20 cm. and a cooling jacket. To form a center-downward and annulus upward path, one of the cooling units is higher than the surface of the AMF liquor. The nucleated AMF is evenly distributed in the crystallizer where the crystals grow in a static environment. Water can be used as a coolant in the heat exchanging means to gently cool the system, remove any released heat from phase transition and maintain the temperature at the required value.

In the batch process, the nucleated triglyceride mixture remains in the combination unit and crystal growth is allowed to occur in a static environment. Although crystal growth temperature is higher than nucleation temperature, heating is not normally required because of heat release from the phase transition. Water may be used as a coolant to gently cool the system, remove any excess heat released by phase transition and maintain the crystal growth temperature at the required value.

For both continuous and batch methods, the optimal crystal growth period is about 3 hours.

Figure 3:
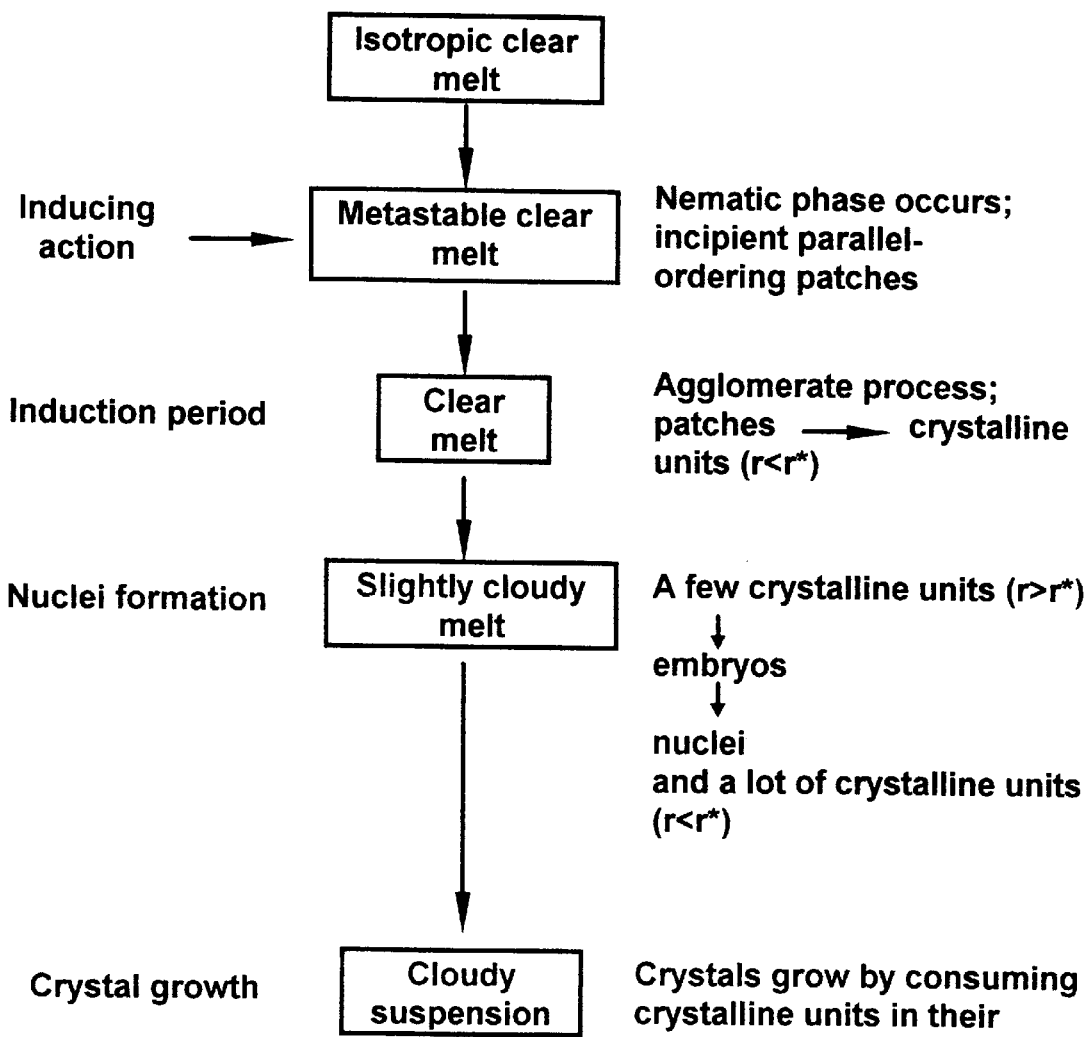
FIG. 3 is a diagram showing the postulated mechanisms of nuclei formation and crystal growth in lipid triglycerides.

FIG. 3 is a diagrammatic chart showing the hypothetical procedure of nucleus formation and crystal growth. While Applicants do not wish to be bound by any particular theory, the chart illustrates one possibility of what may be occurring during the nucleation step, as may be deduced from certain theoretical works. The isotropic clear melt becomes metastable, with incipient parallel ordering of triglyceride molecules locally in "patches". Next these patches agglomerate to form a smectic-like state. A few of these agglomerates progress to a prenucleus stage termed embryos, and groups of embryos become nuclei. With crystal growth to optically perceptible size, the solution becomes cloudy.

After crystal growth in both continuous and batch methods, the crystals settle and the slurry thickens in the bottom of the crystallizer. This thickened slurry is fed or pumped to a separation means. Suitable separation means include a continuous vacuum drum filter, a Florentine continuous vacuum filter and a press type batch filter, all well known in the art. The separation produces solid (stearin) and liquid (olein) fractions.

Figure 2:
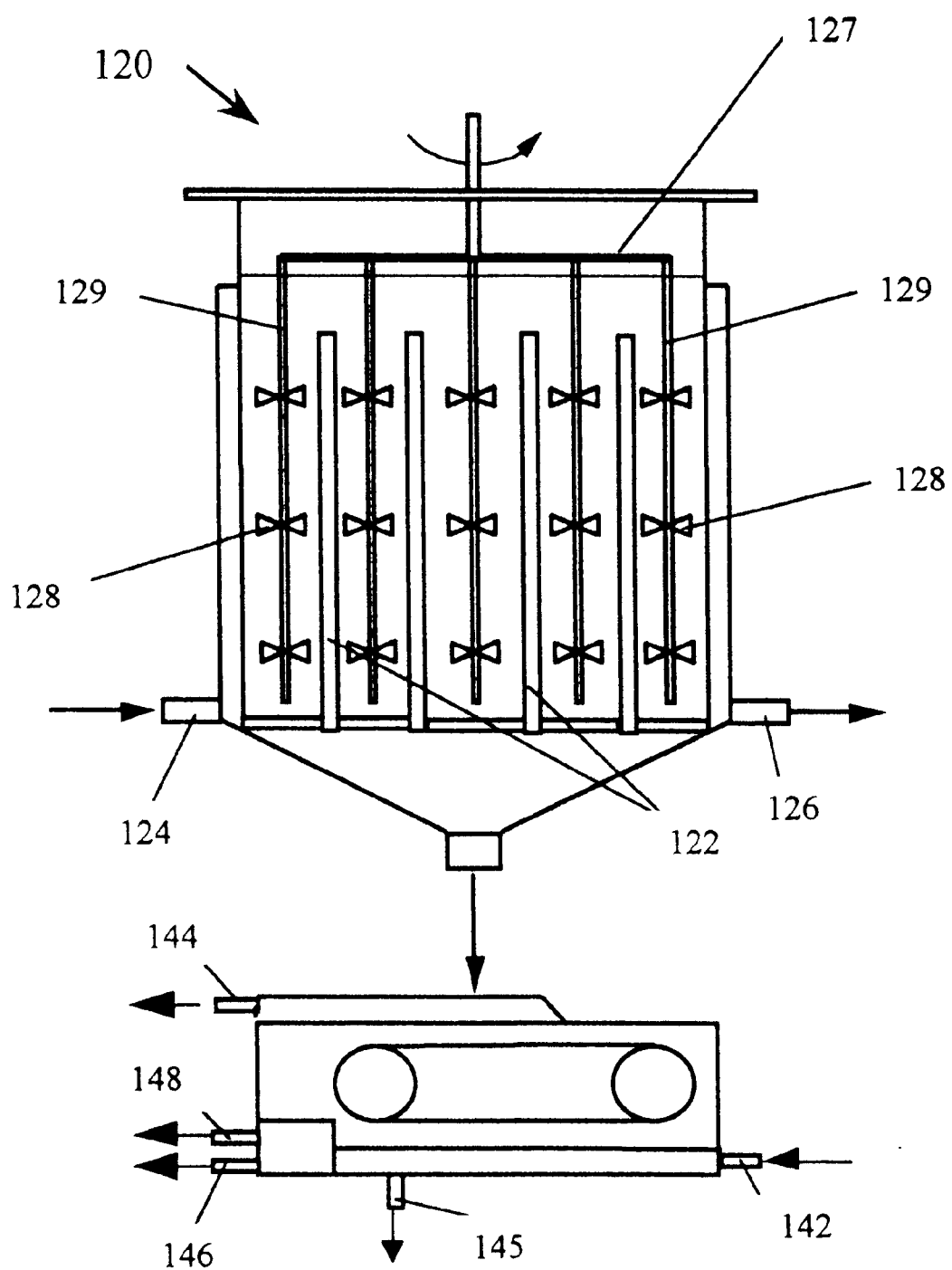
FIG. 2 is a schematic illustration of a fat fractionating apparatus embodying the invention with combined melting, heat exchanging, nucleating and crystallizing units.

As shown in FIG. 1, the nucleator 20 of the present invention may be configured in a separate chamber to more precisely control the environment within the nucleator. Alternatively, the invention may also configure the heat exchanging means and energy input means within the same chamber as the nucleator. Such an apparatus capable of performing melting, nucleating and crystallizing functions in a single unit is depicted in FIG. 2.

FIG. 1 shows a schematic diagram of an apparatus according to the present invention. The apparatus for milk fat fractionation 10 includes a melting tank 12. The melting tank 12 includes a heating means. The heating means may be preferably include both internal 14 and external heating 15 units of types known in the art, each through which a heating medium flows. The melting tank 12 essentially heats the milk fat so that the milk fat is substantially entirely liquid in form. Next, the melted milk fat flows by means of a pump 16 through a heat exchanger 17. Preferably, the heat exchanger 17 is an annular, countercurrent heat exchanger, but may be any other heat exchanging means known in the art such as a plate type or shell and tube type heat exchanging unit. The heat exchanger 17 is capable of cooling the mass of mixed triglycerides at rate of greater than about 20 degrees Centigrade per minute, preferably capable of cooling the mass of mixed triglycerides from about 70 degrees Centigrade to the nucleation temperature in about tens of seconds. A cooling medium flows through the heat exchanger 17 to cool the liquid milk fat. The cooling medium enters the heat exchanger 17 through the heat exchanger coolant inlet 18 and the exiting through the heat exchanger coolant outlet 19. The milk fat exiting the heat exchanger 17 is still, for a time at least, liquid in form.

Next, the milk fat flows into the nucleator 20 through the nucleator inlet 21. The nucleator 20 may be any geometric configuration or shape that allows for the even input of energy throughout the mass of mixed triglycerides (e.g. no "dead spots" exist during energy input). Temperature of the nucleator is controlled by coolant flowing through the nucleator through the nucleator coolant inlet 24 and the exiting through the nucleator coolant outlet 26. In the nucleator, energy is supplied for nucleation by an energy input means. The energy input means may be any means capable of providing the delta G (Gibbs free energy) threshold for critical size for nucleation. Preferably, the energy input means comprises an agitator 27 with a plurality of impellers 28, alone or in combination with baffles (not shown). Milk fat exiting the nucleator through the nucleator outlet (not shown) may not appear to have any solid component but in fact contains nucleus embryos. The energy input into the nucleator 20 may be precisely controlled to allow nucleation of specific types of triglycerides to begin within the milk fat melt. At a stable crystallization temperature which is maintained by suitable cooling, the induced nucleation caused by the nucleator will cause a substantial increase in crystalline formation.

The nucleated triglycerides are then pumped or fed into the crystallizer 40 and are distributed in the crystallizer by the distributor 42. The temperature of the crystallizer is controlled by a least one heat exchanging member 44 mounted in the crystallizer 40. The heat exchanging member may be in any configuration, preferably the heat exchanging member 44 is an annular heat exchanging member mounted concentrically in the crystallizer 40. Coolant flows into the annular heat exchanging member 44 through the crystallizer coolant inlet 46 and exits through the crystallizer coolant outlet 48. After sedimentation, which is a preliminary separation, part of the olein exits at the top of the crystallizer through the top outlet 49.

The crystallized triglyceride mass exits the crystallizer 40 through the slurry outlet 50 and the liquid and solid phases are separated by a separating means. The separating means may be filters of any commercially available type such as a continuous vacuum drum filter, a Florentine continuous vacuum filter and a press type batch filter, preferably a vacuum filter 60 with a medium-reconditioning zone in its filtration cycle. The temperature of the vacuum filter 60 is controlled by the input of heating medium through the separator heating medium inlet 62. Sufficient vacuum is provided for the filter via a connecting port 63. The heating medium exits the vacuum filter 60 through the heating medium outlet 65. The liquid phase exits the vacuum filter 60 through the liquid phase outlet 64, while the solid phase exits the vacuum filter 60 through the solid phase outlet 66.

Another embodiment of an apparatus according to the present invention is schematically diagrammed in FIG. 2. The apparatus for triglyceride separation includes a combination melting/nucleating/crystallizing unit or combination unit 120 including a heat exchanging means, which may be at least one heat exchanging member 122. The heat exchanging member 122 is mounted in the combination unit 120. The heat exchanging means is capable of decreasing the temperature of the mixed triglyceride mass at a rate of about 1.0 degrees Centigrade per minute. Most preferably, the heat exchanging means is capable of decreasing the temperature of the mass of mixed triglycerides from about 70 degrees Centigrade to about the nucleation temperature as rapidly as possible or in about 20 minutes. Preferably, the heat exchanging member 122 is at least one annular heat exchanging member mounted concentrically in the combination unit 120. The heat exchanging member is configured such that the ratio of the surface area of the heat exchanging member to the volume of the nucleator is from about 1:5 to 1:15, most preferably about 1:10. Heat transfer medium enters the heat exchanging member 122 through the heat transfer inlet 124 and exits through the heat transfer outlet 126. The energy input means is mounted to provide uniform energy input throughout the central part of the combination unit during nucleation. The energy input means is preferably an agitator 127 including impellers 128, paddles 129 and/or a baffles (not shown) capable of providing the delta G (Gibbs free energy) threshold for critical size. The crystallized triglyceride mass exits the combination unit 120 through the slurry outlet 130 and the liquid and solid phases are separated by the separating means. The separating means may be filters of any commercially available type such as a continuous vacuum drum filter, a Florentine continuous vacuum filter and a press type batch filter, preferably a vacuum filter 140 with a medium-reconditioning zone in its filtration cycle. The temperature of the separating means is controlled by the input of heating medium through the separator heating medium inlet 142. Sufficient vacuum is provided for filtering via a connecting port 144. The heating medium exits the vacuum filter 140 through the heating medium outlet 145. The solid phase exits the vacuum filter 140 through the solid phase outlet 146, while the liquid phase exits the vacuum filter 140 through the liquid phase outlet 148.

EXAMPLES

Crystallization of milk fat is influenced by many factors. To obtain milk fat fractions with desired physical properties and control the fractionation process efficiently via melt crystallization, it is necessary to understand the mechanisms of nuclei formation and crystal growth, as well as the dependence of crystallization characteristics of milk fat upon the operating variables.

General Methods:

Anhydrous milk fat (AMF) was obtained from Level Valley Dairy Co. (West Bend, Wis.).

Crystallization: AMF was melted and stabilized by heating to about 80 degrees Centigrade for 1 hour. Cooling occurred in a cold water bath set at the desired nucleation temperature. Depending upon the experiment, nucleation occurred spontaneously or was induced by an agitator with a plurality of impellers. Crystal growth occurred in either a static or dynamic environment in a temperature controlled water bath.

Separation: Solid and liquid phases were separated by vacuum filtration through Whatman #4 filter paper.

Acetone Washing: To measure liquid entrainment in the filter cakes, some solid fractions were washed with acetone in a beaker while hand-stirred for 20 seconds followed by vacuum filtration. After evaporation of the acetone, the crystalline and non-crystalline portions of the solid fraction were obtained from the cake and filtrate, respectively.

Analysis:

Fraction yield was calculated from the fraction mass after filtering and is expressed as a percentage of the total pre-filter weight.

Thermal profiles and maximum melting temperatures (MMT) were obtained from heating program at a 5 degree Centigrade/min rate on a Perkin-Elmer DSC 7 differential scanning calorimeter (Perkin Elmer, Norwalk, Conn.).

TAG composition was determined on a Hewlett Packard 5890 gas chromatography (GC) system.

Crystal and nuclei number was determined by light microscopy.

Example 1

Figure 5:
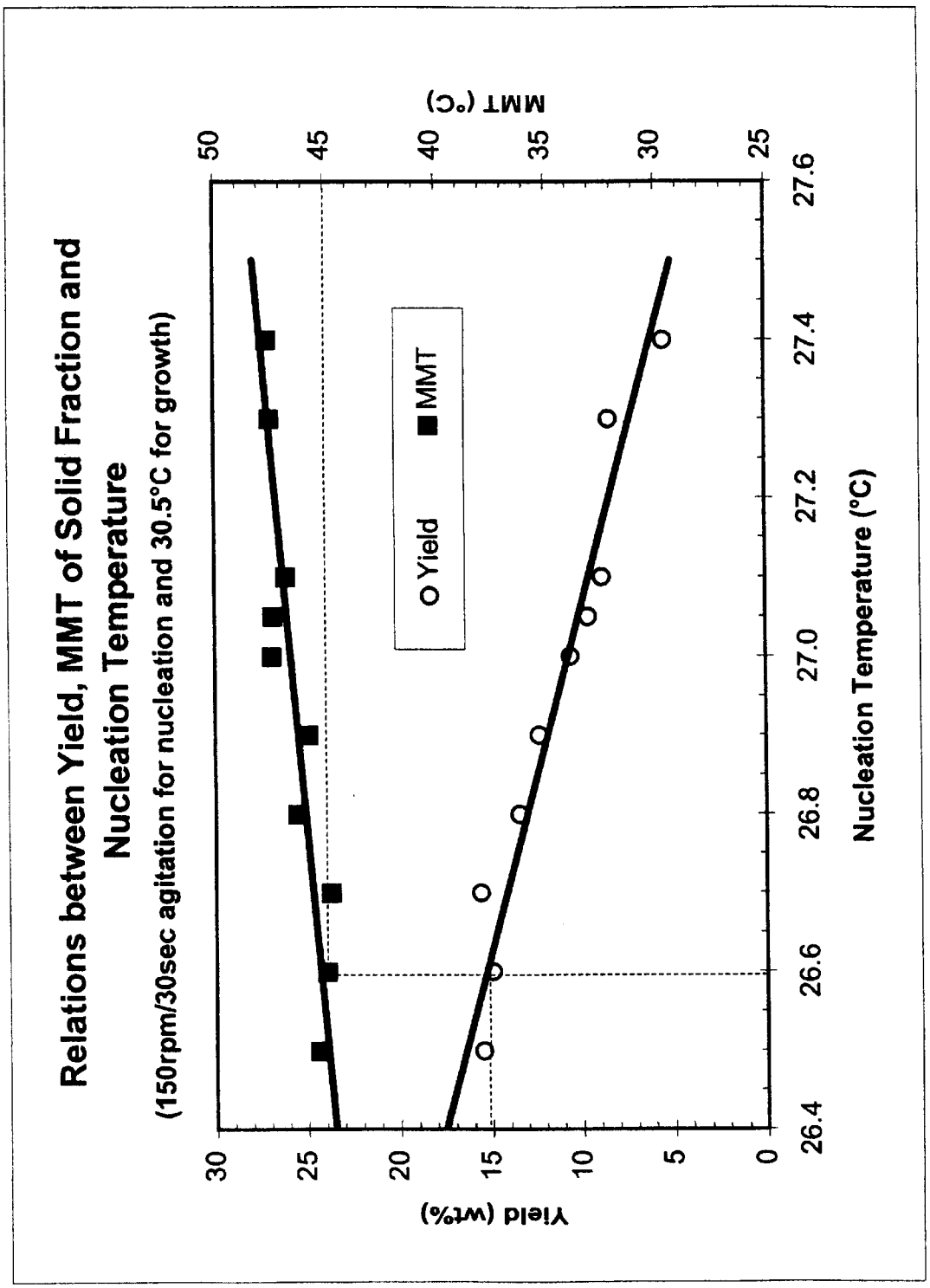
FIGS. 5 and 6 are plots showing the relation between yield, maximum melting temperature and nucleation temperature.
Figure 6:
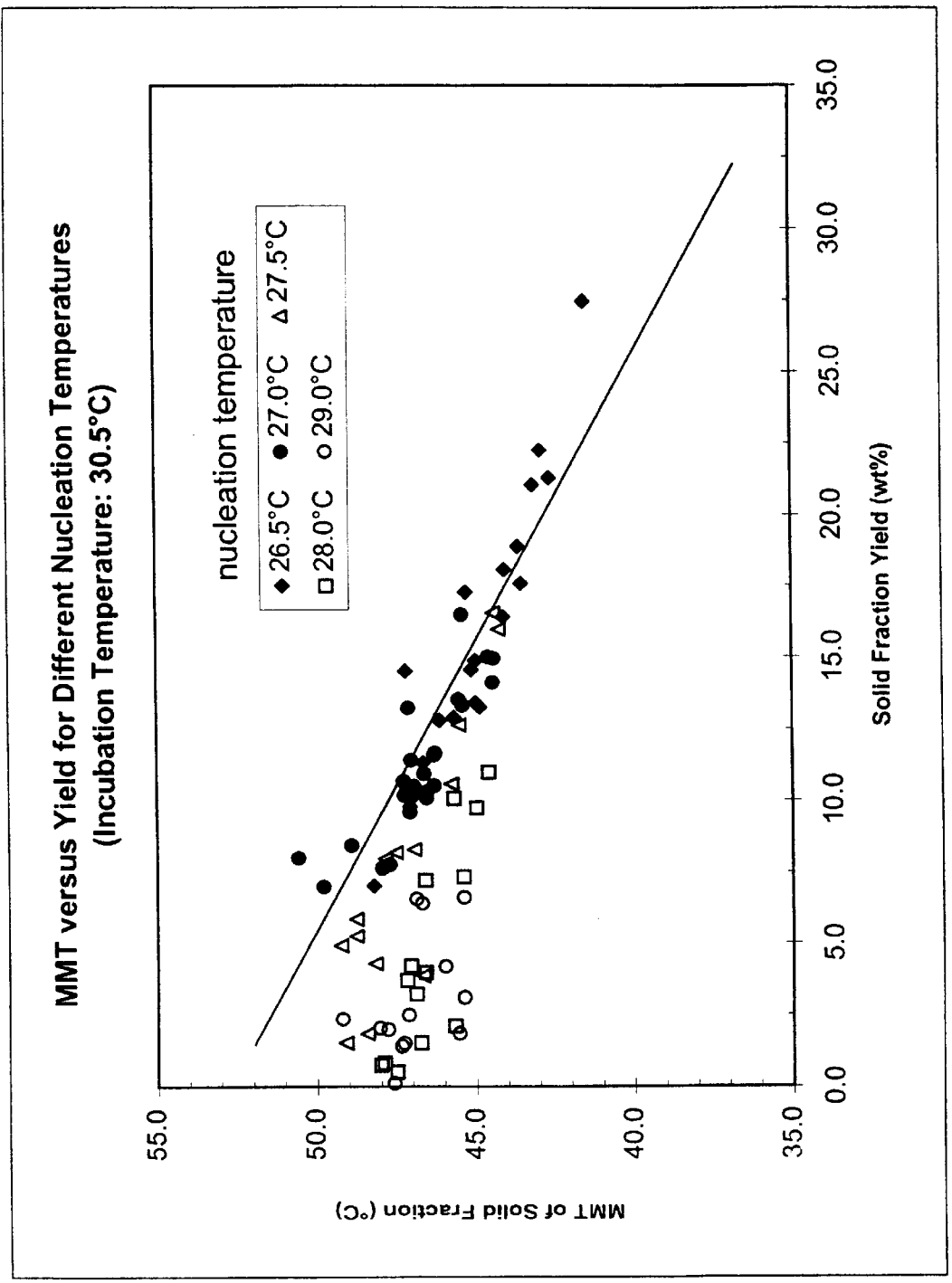

The relationship between yield, MMT and nucleation temperature was determined. Samples of melted AMF were nucleated at varying temperatures. The crystal growth temperature was held constant at 30.5 degrees Centigrade and the nucleation energy input for each sample was 150 rpm for 30 sec. Percent crystal yield was determined for each sample as above. Percent yield of solid fraction and the MMT of each fraction were plotted against nucleation temperature. The results are shown in FIGS. 5 and 6. As nucleation temperature increased, yield decreased and MMT increased.

Example 2

The relationship between nucleation rate and the Reynolds number of agitation for nucleation was determined at various nucleation temperatures. Nucleation rate is expressed as (number nuclei/ml-min). The Reynolds number for agitation may be defined as:

Reynolds number=$d^2 n \rho / \mu$ where d=diameter of agitator impeller (m)

n=agitation speed (1/sec)

$\rho$=density of the melt (kg/m$^3$)

$\mu$=viscosity of the melt (Pa-sec).

Figure 7:
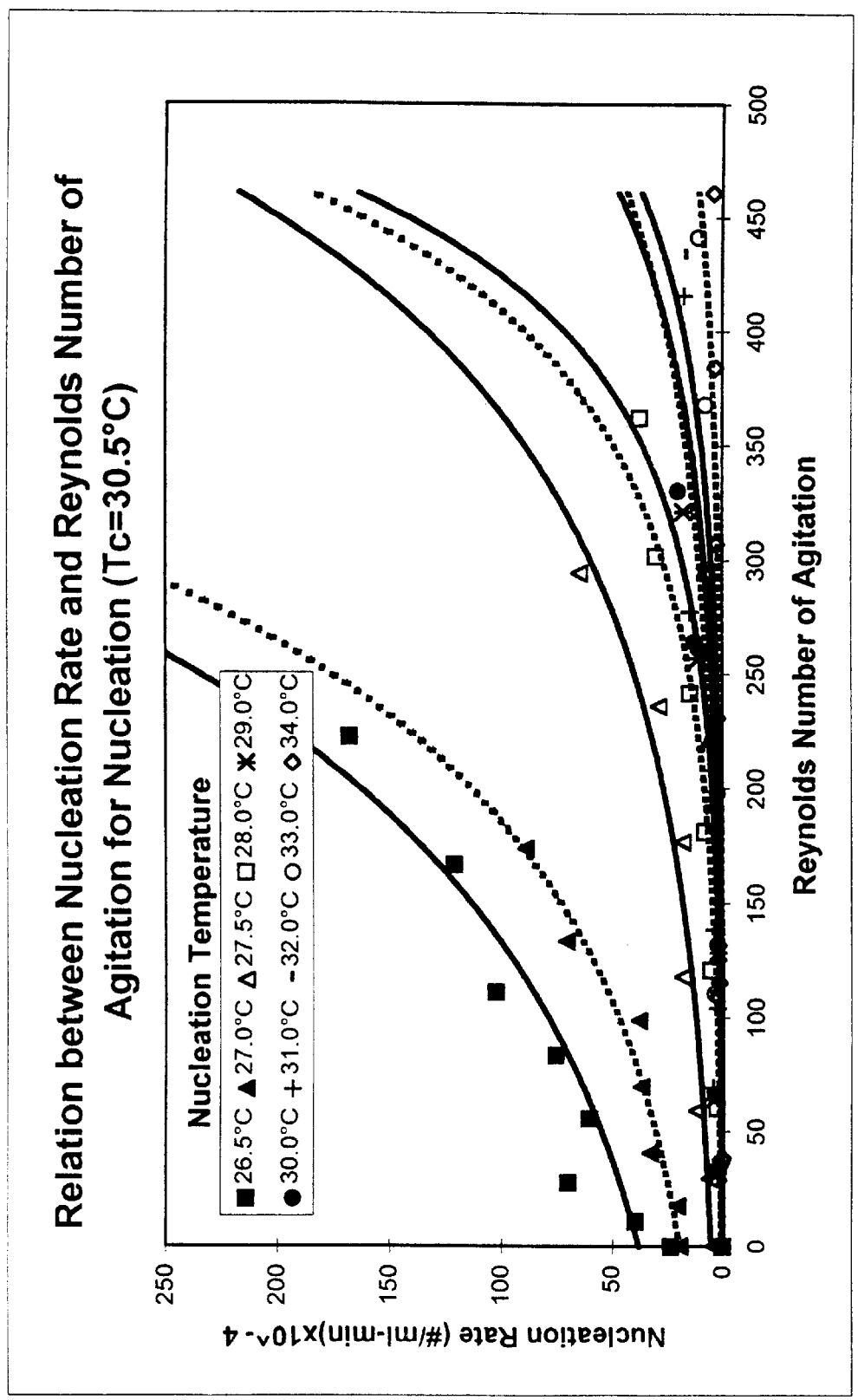
FIG. 7 is a plot showing the experimental relationship between nucleation rate and the Reynolds number during induced nucleation.

Growth temperature for all samples occurred at 30.5 degrees Centigrade. Nuclei number for each sample was determined by light microscopy. The results are shown in FIG. 7. Nucleation rate generally increased as agitation rate increased, but nuclei formed at different nucleation temperatures gave rise to different curves. At lower nucleation temperatures less energy needs to be provided for desired nucleation.

Example 3

Figure 8:
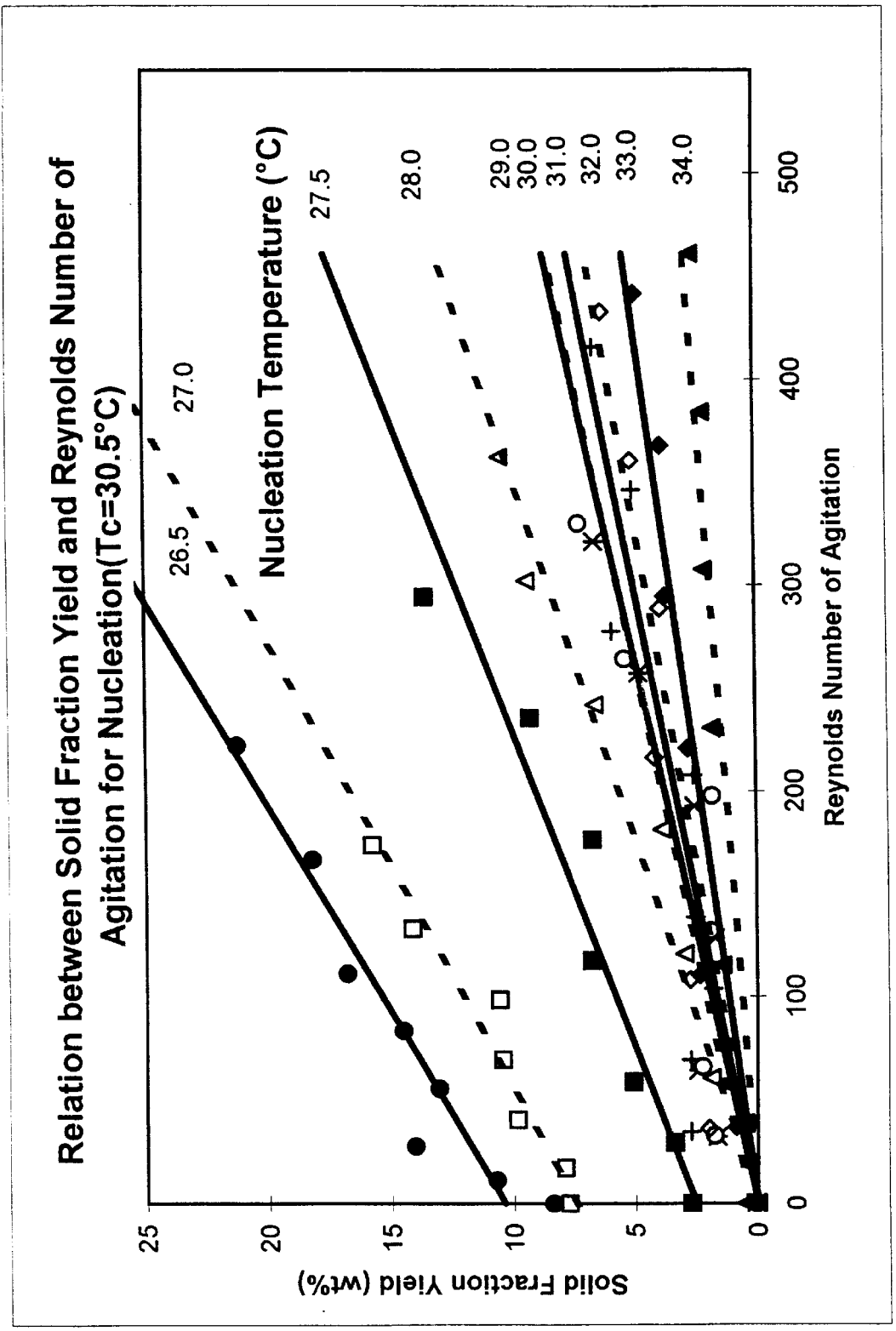
FIG. 8 is a plot showing the experimental relationship between solid fraction yield and the Reynolds number.
Figure 9:
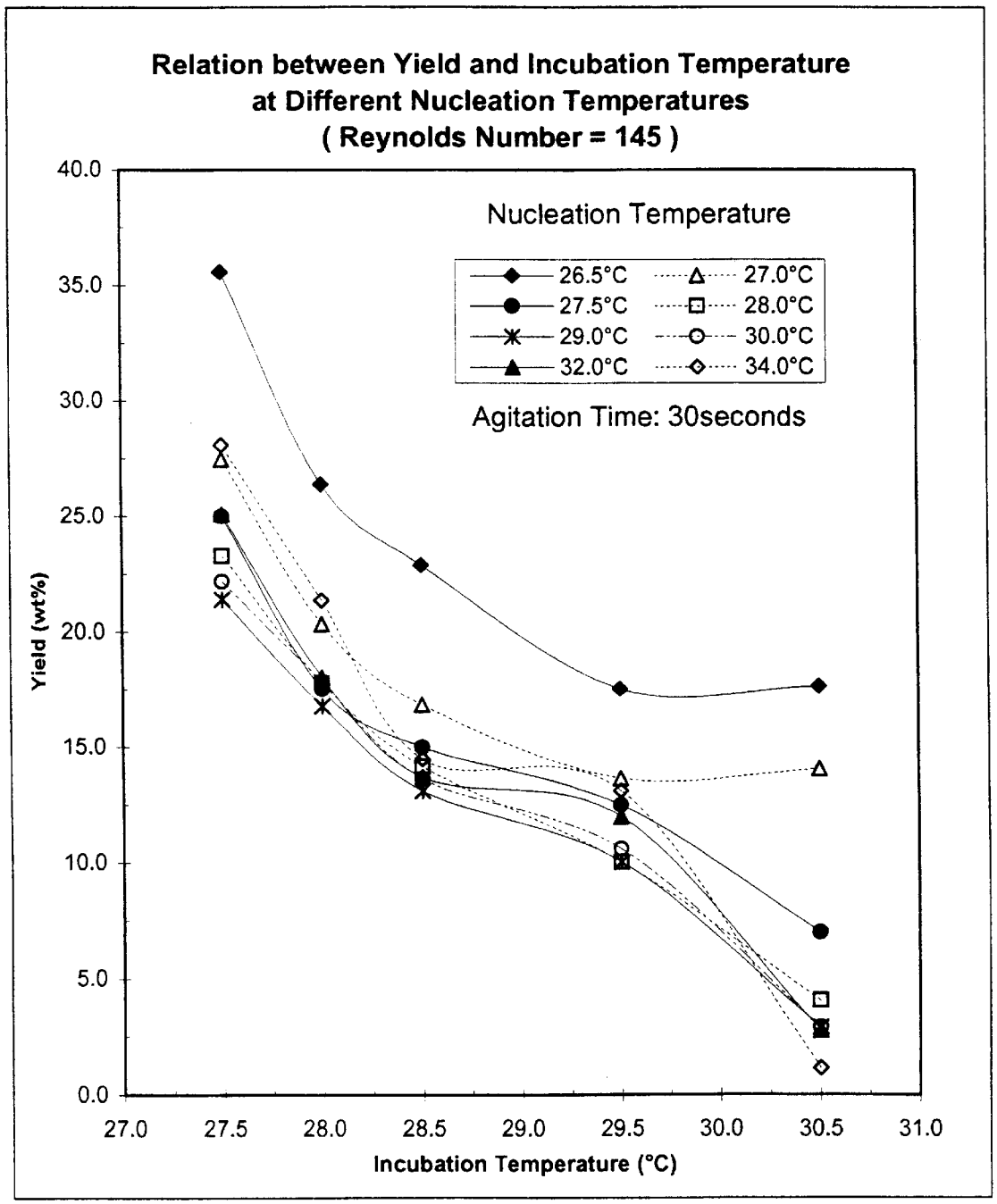
FIG. 9 is a plot showing solid fraction yield at different nucleation and crystallization temperatures.

The relationship between solid fraction yield and Reynolds number of agitation for nucleation was determined for different nucleation temperatures. The crystal growth for each sample was 30.5 degrees Centigrade. Percent crystal yield was determined for each sample as above. The results are summarized in FIG. 8. Solid fraction yield, expressed as a percentage of total weight, generally increased with an increasing Reynolds number. Yields increased with decreasing nucleation temperature. The slopes of the lines also increased with decreasing temperature.

Example 4

Complex relations exist among variables including AMF chemical composition, nucleation temperature, agitation intensity for nucleation, crystal growth temperature, yield and MMT of produced fractions. Among these factors, AMF composition, agitation intensity, nucleation temperature and crystal growth temperature are independent and influence the final fractionation results. For any given fractionation system, control experiments must be conducted that allow optimization for producing fractions of a given MMT. Appropriate crystal growth temperatures and energy input values must be selected first, and then experiments conducted to determine optimal nucleation temperatures to obtain crystals of a given MMT. The following example provides examples of such charts and how they are used in the practice of this invention.

AMF composition is the single most important factor affecting the determination of operating parameters. The TAG concentration of AMF lots in terms of g(C46–C52)/g (<=C40) ranges generally from about 0.6 to 0.8.

Nucleation temperature and agitation intensity control the number and type of nuclei generated. For optimal results, higher supersaturation and a suitable agitation intensity are desirable.

The crystal growth temperature directly affects supersaturation and viscosity, and hence, the procedure of crystal structure transformation and crystal agglomeration. To take advantage of higher supersaturation and lower viscosity for better structure transformation and agglomeration, suitable crystal growth temperatures are in the range from about 28 to 31 degrees Centigrade corresponding to a TAG concentration of 0.6 to 0.8.

Figure 4:
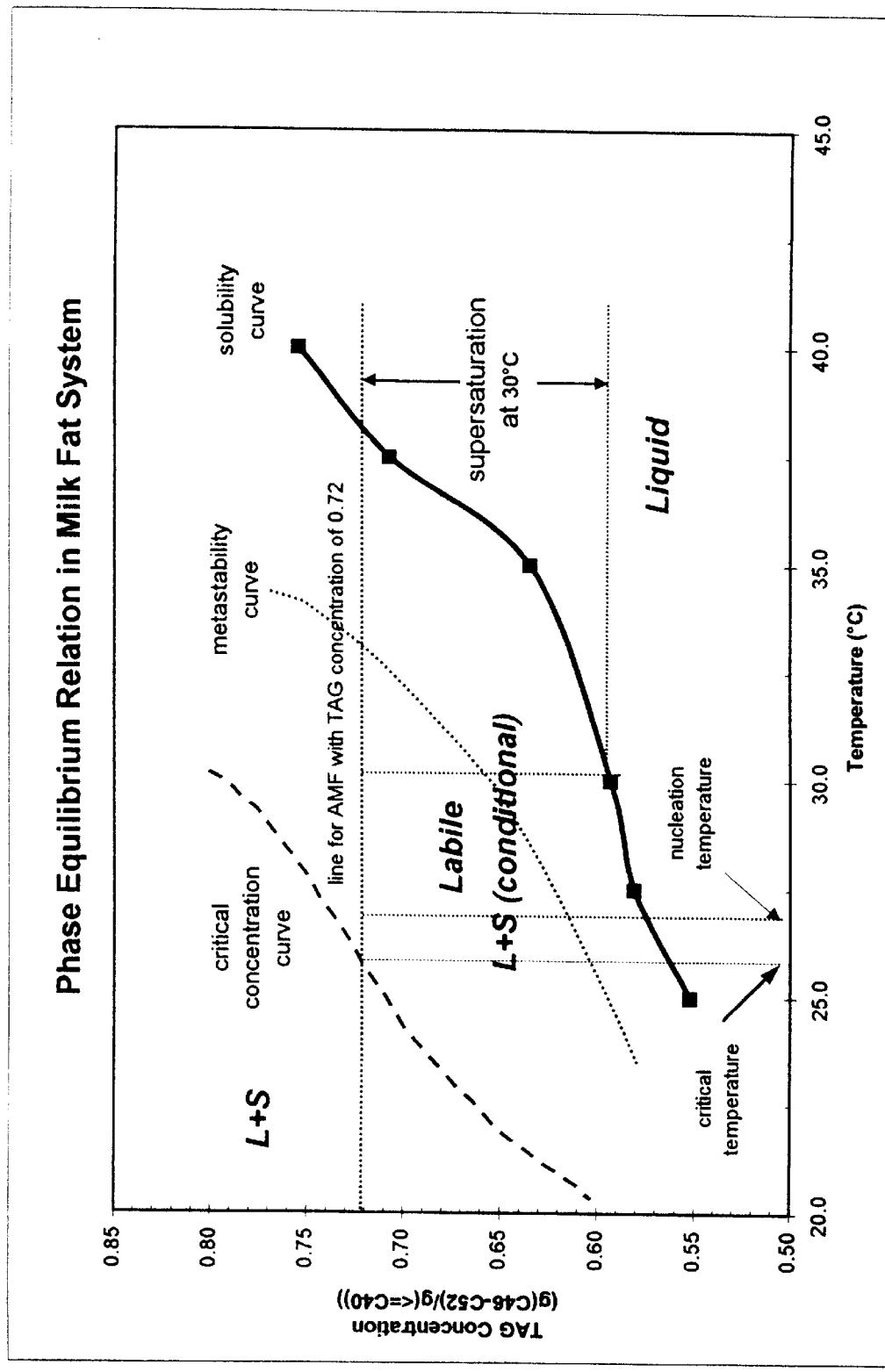
FIG. 4 is a plot showing a typical solubility curve of milk fat, e.g. the ratio of solute triglycerides to solvent triglycerides at various temperatures.

To determine the optimal parameters, the TAG composition of the AMF is determined by gas chromatography. According to the TAG concentration, the appropriate nucleation and crystal growth temperature may be determined by consulting the general milk fat phase equilibrium chart FIG. 4. First, draw a horizontal line (the TAG composition line) from the TAG concentration across the graph. This line will intersect the critical concentration, metastability and solubility curves. The extent of supersaturation at any given temperature may be determined by the difference between the TAG concentration of AMF and the solubility at that temperature. Since the driving force for crystallization is the difference between the melting point of the triglyceride crystals and the actual solution temperature, it is desirable to select a crystal growth temperature that reflects a relatively high degree of supersaturation. Then, the critical temperature for the TAG composition is determined by where the TAG composition line intersects the critical temperature curve on the phase diagram. To determine a precise critical temperature, cooling tests (e.g. differential scanning colorimetry) may be conducted. The suitable nucleation temperature is slightly higher than the critical temperature and further depends on the MMT of the solid fraction desired, which can be found in FIG. 5. A suitable $T_c$ (crystal growth temperature) will lead to a maximum yield of solid fraction with a desired MMT. Generally, too low a $T_c$, will lead to a decreased MMT and product quality, and too high a $T_c$ will lead to a decreased yield. FIG. 5 plots the experimentally determined relation between yield, MMT of the solid fraction and nucleation temperature for a particular AMF. This graph assumes an agitation rate of 150 rpm for 30 sec, providing a Reynolds number of about 100, and growth at a suitable temperature of 30.5 degrees Centigrade. A vertical line intersecting the MMT desired gives the appropriate nucleation temperature and where this line intersects the yield line indicates approximate yield.

For example, assume the TAG composition a particular lot of AMF is 0.72. According to FIG. 4 the critical temperature is 26 degrees Centigrade. Next, assume a MMT of 45 degrees Centigrade is desired. Turning to FIG. 5, a solid fraction with an MMT of 45 degrees Centigrade is related to a nucleation temperature of about 26.6 degrees Centigrade. The yield will be about 15% when crystal growth occurs at 30.5 degrees Centigrade and the Reynolds number is about 100.

If the desired MMT and yield of the solid fraction, agitation intensity and crystal growth temperature are not covered by FIG. 5, adjustments are necessary. Usually, increase of agitation speed (or Reynolds number), decrease of nucleation temperature and decrease of crystal growth temperature will lead to lower MMT and a higher yield of solid fraction. FIGS. 6, 7, 8, and 9 can be used for determination of suitable adjustments. These charts do not apply to all AMF sources and conditions, but charts may be obtained by additional experimentation. These newly developed charts may then be used as above to determine optimal operation parameters.

In the present invention precise control of nucleation temperature, energy input, and crystal growth temperature is possible. Nucleation and crystal growth are separated, allowing for the fractionation of crystals with well defined MMTs.

Example 5

Figure 10:
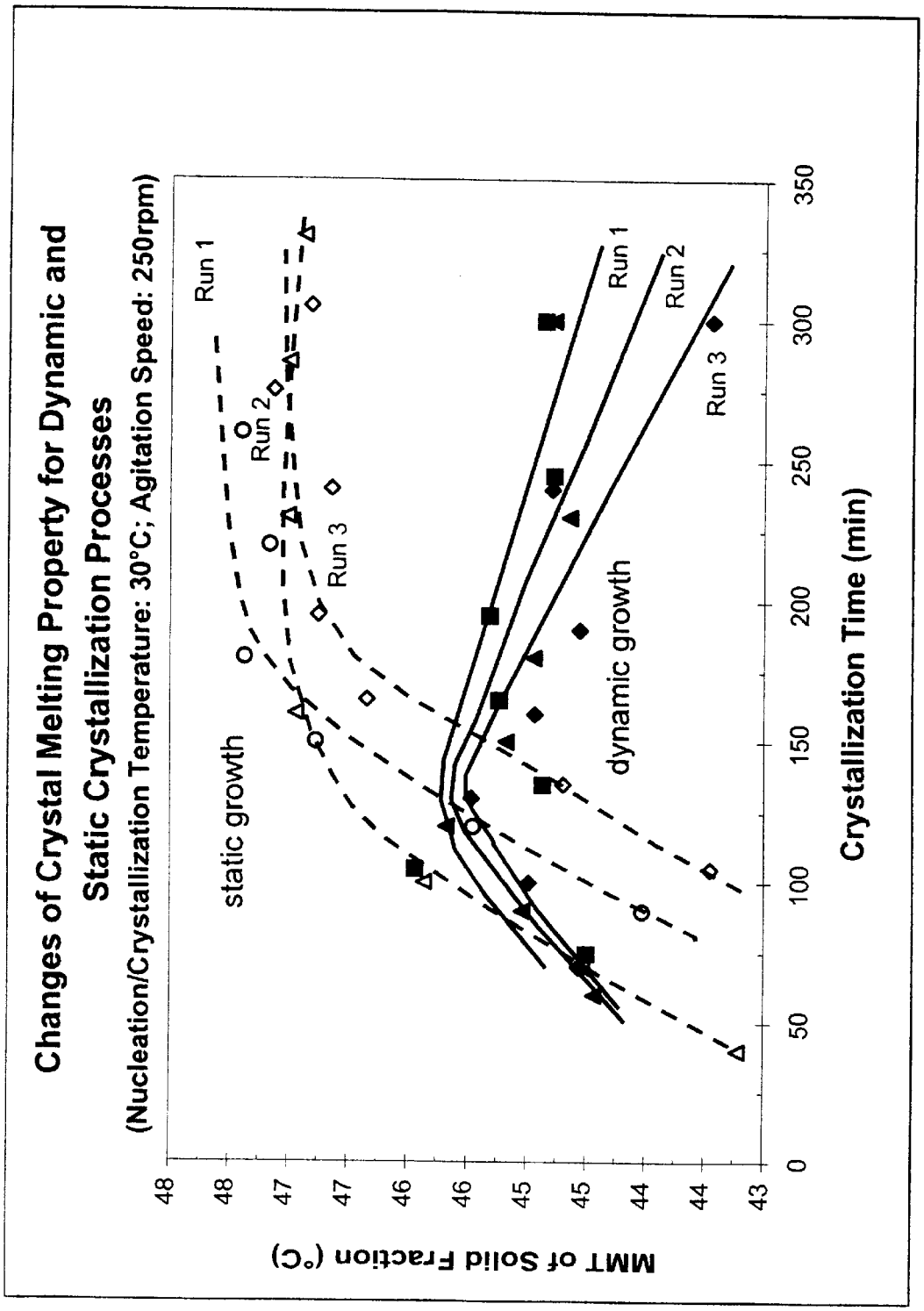
FIG. 10 is a plot comparing the MMT's of crystals grown in a static environment and crystals grown in a dynamic (agitated) environment.

The MMT of crystals grown in static and dynamic environments was analyzed. For static environment crystal growth, nucleation was induced for 30, 60 or 600 seconds at 250 rpm followed by a static growth period. Dynamic environment crystal growth occurred at constant agitation rate of 250 rpm. Percent crystal yield and MMT for each sample was determined as above. The results for MMT are shown in FIG. 10. The static growing conditions resulted in the formation of crystals with a uniform MMT that was maintained for the length of the growing cycle. The dynamic growing conditions resulted in the formation of a heterogenous population of crystals in which the MMT varied with the length of the crystal growing cycle. These data indicate that the crystals obtained from static growing conditions are of a more homogenous nature than crystals obtained from dynamic growing conditions. Precise control of nucleation therefore results in a superior fractionation product.

Example 6

Figure 11:
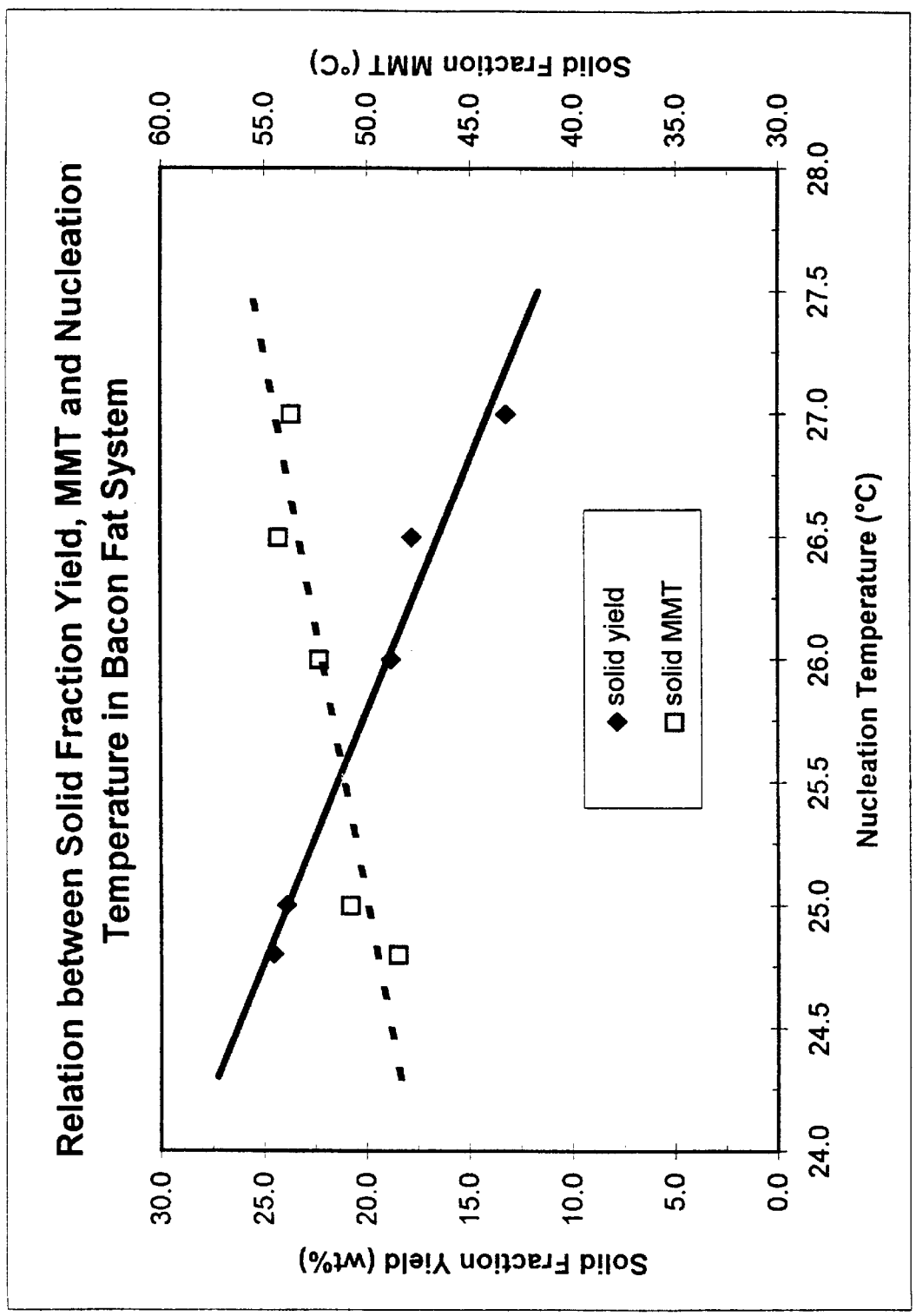
FIG. 11 is a plot showing the relation between solid fraction yield, MMT and nucleation temperature for bacon fat.
Figure 12:
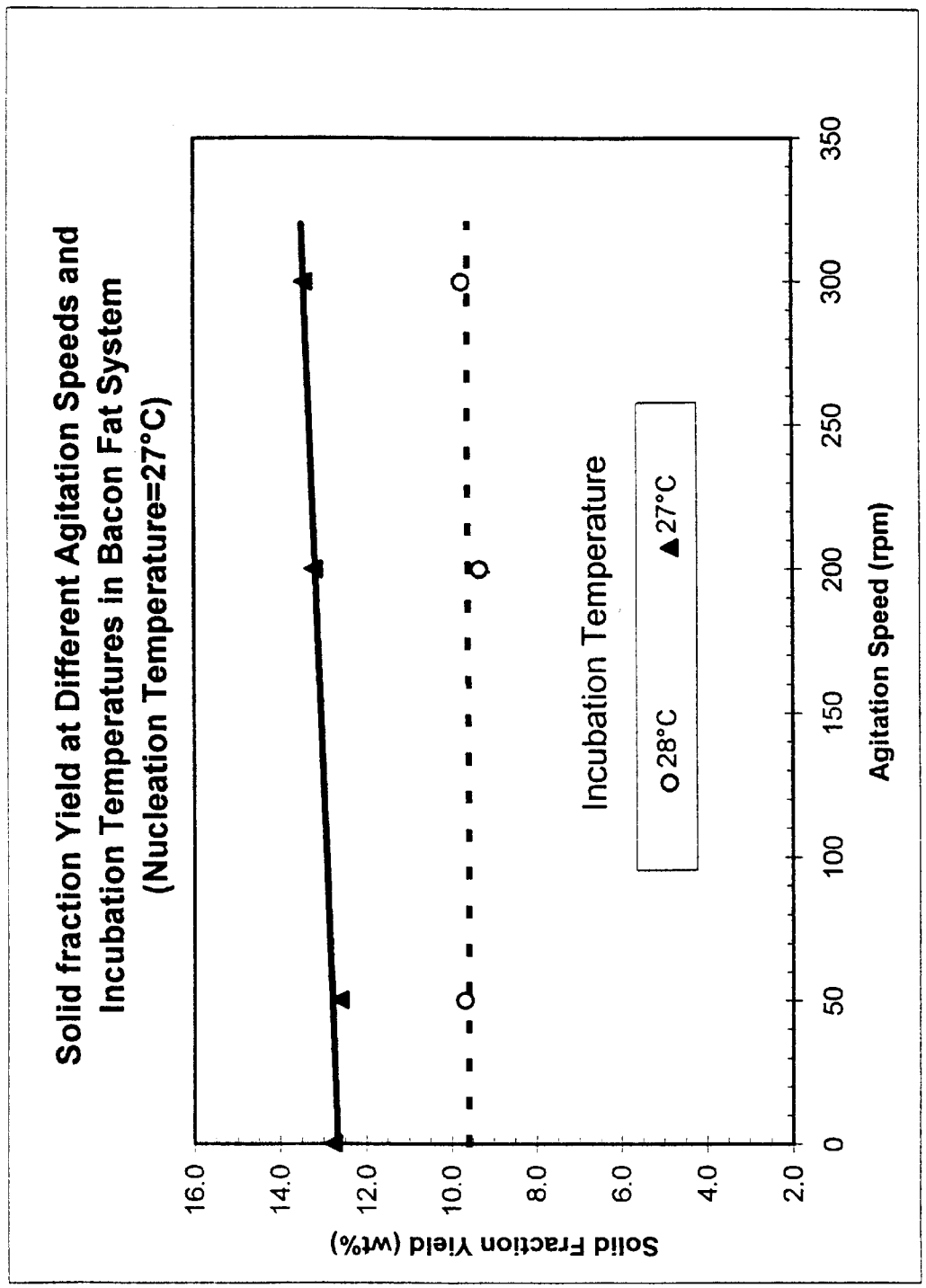
FIG. 12 is a plot showing the solid fraction yield from bacon fat at different agitation speeds and incubation temperatures.
Figure 13:
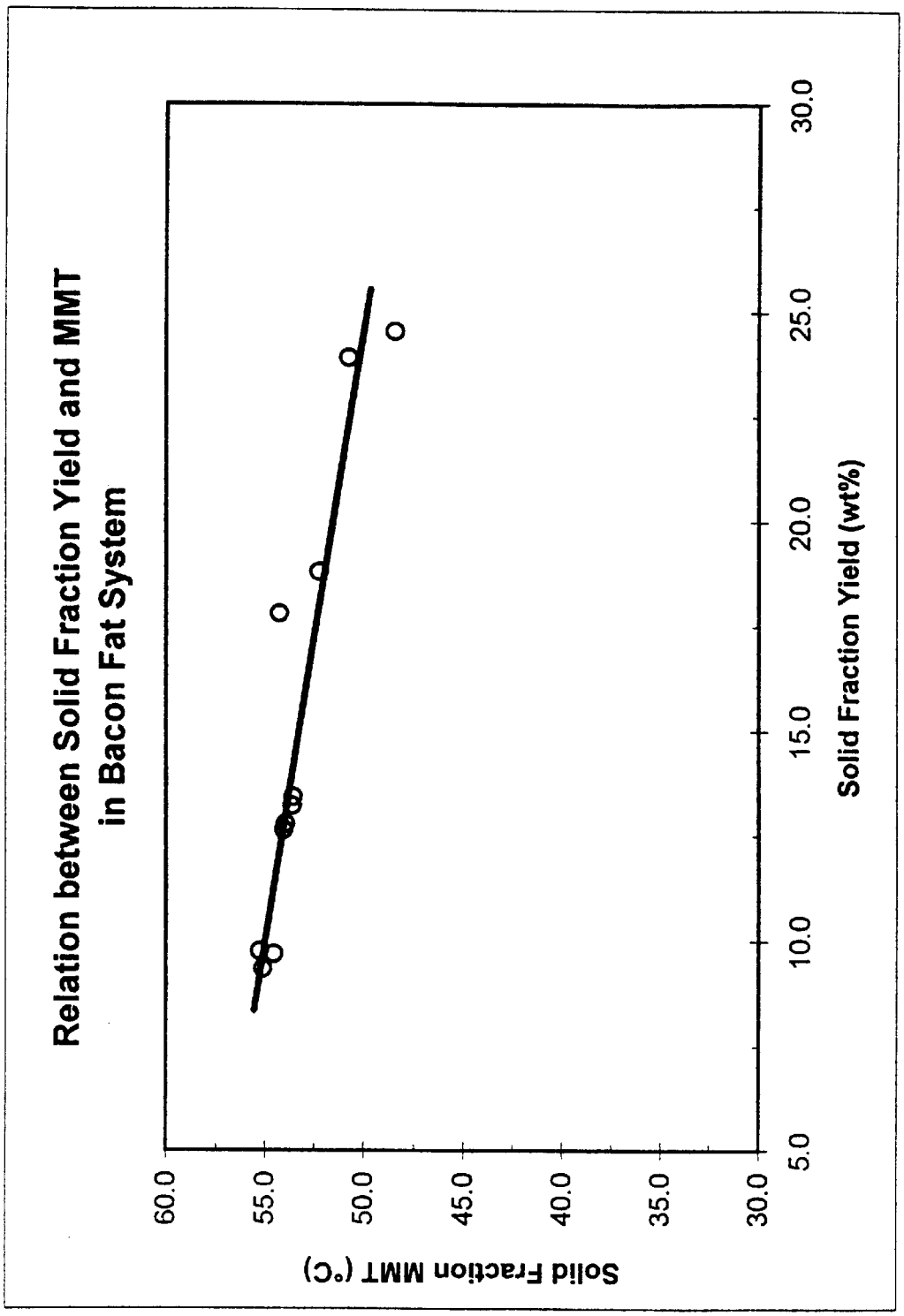
FIG. 13 is a plot showing the relation between solid fraction yield and MMT for bacon fat fractionation.

Bacon fat with a melting temperature of about 34° C. was successfully fractionated by the inventive method. With bacon fat, the process was more easily controlled because bacon fat has a simpler triglyceride composition than AMF. By using different nucleation temperatures, agitation speeds and incubation temperatures, bacon fat solid fractions with MMTs from 50 to 55° C. with corresponding yields from 10% to 25% were obtained. FIGS. 11, 12 and 13 show the relations among solid fraction yield, MMT, nucleation temperature, agitation speed and incubation temperature.

Example 7

Figure 14:
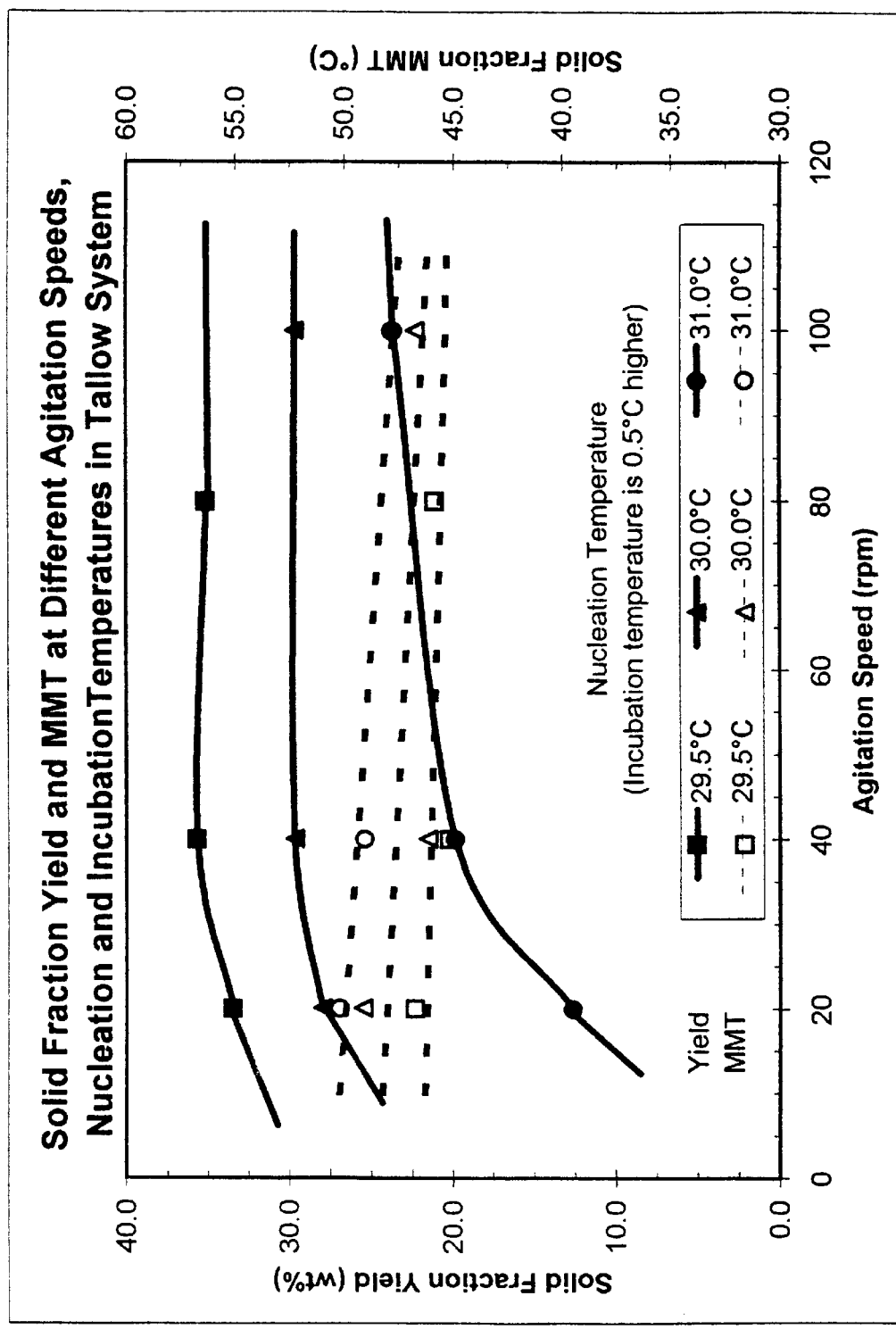
FIG. 14 is a plot showing the solid fraction and MMT for tallow at different agitation speeds, nucleation and incubation temperatures.

Tallow with an MMT of about 38° C. was also successfully fractionated by use of the inventive process. As for bacon fat, it was much easier to control the process for tallow than for AMF. Different solid fractions with MMTs of about 45 to 50° C. and yields of 10% to 35% were obtained depending upon nucleation temperature and agitation speed used. The results of the fractionation are presented in FIG. 14.

Example 8

Figure 15:
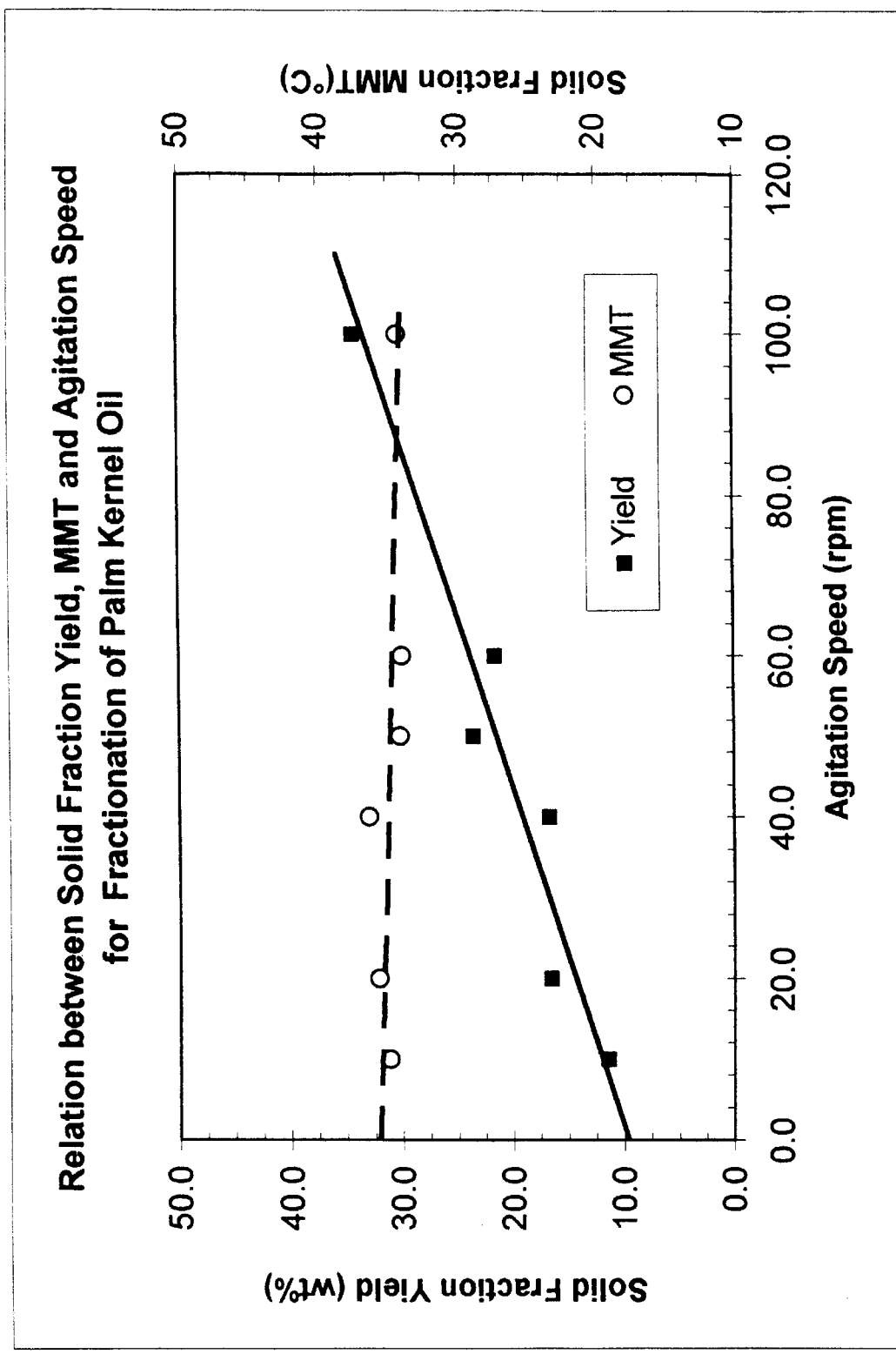
FIG. 15 is a plot showing the solid fraction and MMT for palm kernel oil at different agitation speeds, nucleation and incubation temperatures.

Palm kernel oil with an MMT of about 29° C. was fractionated into olein and stearin with distinct melting points of about 25° C. and 35° C., respectively. Suitable nucleation and crystal growth temperatures for fractionation were found as about 22.5° C. and 25.0° C., respectively. As the agitation speed for induced nucleation increased, the yield of solid fraction increased. However, the MMT of the solid fraction had only a slight decrease as the agitation speed increased. The results of fractionation of palm kernel oil at the above mentioned nucleation and crystal growth temperatures are shown in FIG. 15.

What is claimed is:

1. An apparatus for fractionating a melt of mixed triglycerides, said apparatus comprising:
   a heat exchanger for supercooling the melt of mixed triglycerides;
   a nucleator for controlling the energy and condition of the melt of mixed triglycerides, said nucleator having an inlet and an outlet and including an agitator means, said inlet of said nucleator being connected to said heat exchanger; and
   a crystallizer connected to the outlet of said nucleator.

2. The apparatus of claim 1, wherein said apparatus is adapted to fractionate a mass of milk fat.

3. The apparatus of claim 1, further comprising a filter capable of separating a solid triglyceride fraction from a liquid triglyceride fraction of the melt of mixed triglycerides.

4. The apparatus of claim 1, wherein said nucleator comprises a separate chamber for nucleating said melt of mixed triglycerides.

5. The apparatus of claim 1, wherein said crystallizer provides a static environment for growth of crystals in said melt of mixed triglycerides.

6. The apparatus of claim 1, wherein said crystallizer includes a means for regulating the temperature of the melt of mixed triglycerides.

7. The apparatus of claim 1, wherein said heat exchanger comprises an annular countercurrent heat exchanger capable of decreasing the temperature of said melt of mixed triglycerides at a rate greater than about 20° C. per minute.

8. An apparatus for fractionating a melt of mixed triglycerides, said apparatus comprising:
   a combination unit for controlling the energy and condition of the melt of mixed triglycerides, said combination unit including an energy input means capable of providing the Gibbs free energy threshold for nucleation; and
   a heat exchanging means capable of supercooling the melt of mixed triglycerides, said heat exchanging means mounted in said combination unit.

9. The apparatus of claim 8, wherein said heat exchanging means comprises at least one annular heat exchanging member.

10. The apparatus of claim 9 wherein said annular heat exchanging member is mounted concentrically in said combination unit.

11. The apparatus of claim 9 wherein said annular heat exchanging member and said combination unit are configured such that the ratio of a surface area of said heat exchanging member to a volume of said combination unit is about 10 square meters to one cubic meter.

12. The apparatus of claim 8 wherein said heat exchanging means cools the melt of mixed triglycerides at a cooling rate of greater than about 1.0° C. per minute.

13. An apparatus for fractionating a melt of mixed triglycerides, said apparatus comprising:
    a combination unit for controlling the energy and condition of the melt of mixed triglycerides, said combination unit including an energy input means capable of providing the Gibbs free energy threshold for nucleation; and
    a heat exchanger capable of supercooling the melt of mixed triglycerides, said heat exchanger and said nucleator are configured such that the ratio of a surface area of said heat exchanging member to a volume of said nucleator is about 10 square meters to one cubic meter.

14. The apparatus of claim 13, wherein said heat exchanger further comprises at least one annular heat exchanger, said annular heat exchanger mounted concentrically in said combination unit.

15. The apparatus of claim 1 wherein the agitator means is capable of providing the Gibbs free energy threshold for nucleation.

16. An apparatus for fractionating a mass of triglycerides, comprising:
    a heater, a heat exchanger, a nucleator and a crystallizer;
    the heater for heating a mixed mass of triglycerides into a melt;
    the heat exchanger, operatively connected to the heater, for supercooling the melt into a supercooled melt;
    the nucleator for controlling the energy input into the supercooled melt to initiate crystal nuclei; the nucleator having an inlet and an outlet and including an agitator means; the inlet of the nucleator operatively connected to the heat exchanger; and
    the crystallizer operatively connected to the outlet of the nucleator, for providing a static environment for growth of crystal nuclei into crystals.

17. An apparatus for fractionating a mixed mass of triglycerides, comprising:
    a heat exchanger for supercooling a melt of a mixed mass of triglycerides to a supercooled melt;
    a nucleator for controlling the energy input into the supercooled melt to initiate crystal nuclei; the nucleator having an inlet and an outlet, the inlet operatively connected to the heat exchanger; and
    a crystallizer operatively connected to the outlet of the nucleator, for providing a static environment for the growth of crystal nuclei into crystals.

18. An apparatus for fractionating a mass of triglycerides, comprising:
    a heater for heating a mixed mass of triglycerides into a melt; a heat exchanger, operatively connected to the heater, for supercooling the melt into a supercooled melt; a nucleator for controlling the energy input into the supercooled melt to initiate crystal nuclei; and a crystallizer operatively connected to the nucleator;
    the nucleator supercooling the melt to a temperature below the crystal growth temperature and above the critical temperature of the melt.

19. The apparatus of claim 1 wherein the heat exchanger, nucleator and crystallizer are each contained in a separate vessel.

* * * * *